Oct. 14, 1969   J. GIMMLER   3,472,023
DRIVE ARRANGEMENT FOR AN AUTOMOTIVE VEHICLE
Filed Nov. 13, 1967   3 Sheets-Sheet 3
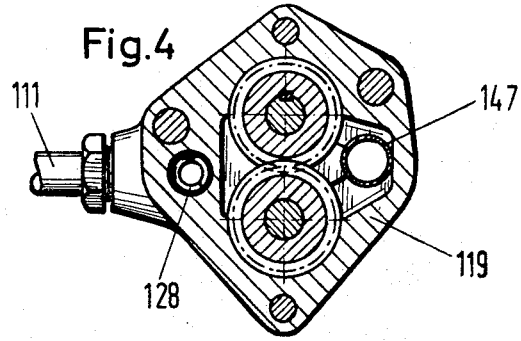
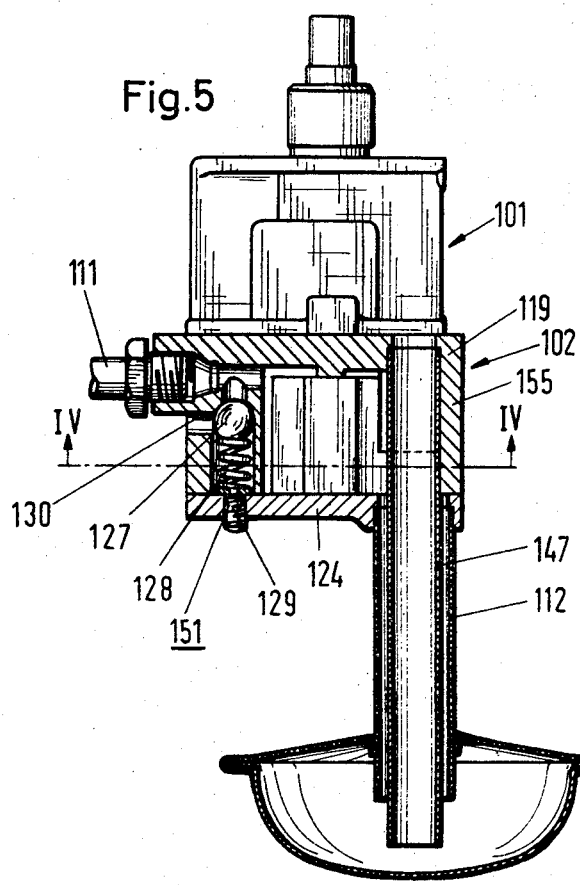
INVENTOR
Joachim Gimmler
By: Howard Beeman
Agents United States Patent Office
3,472,023
Patented Oct. 14, 1969

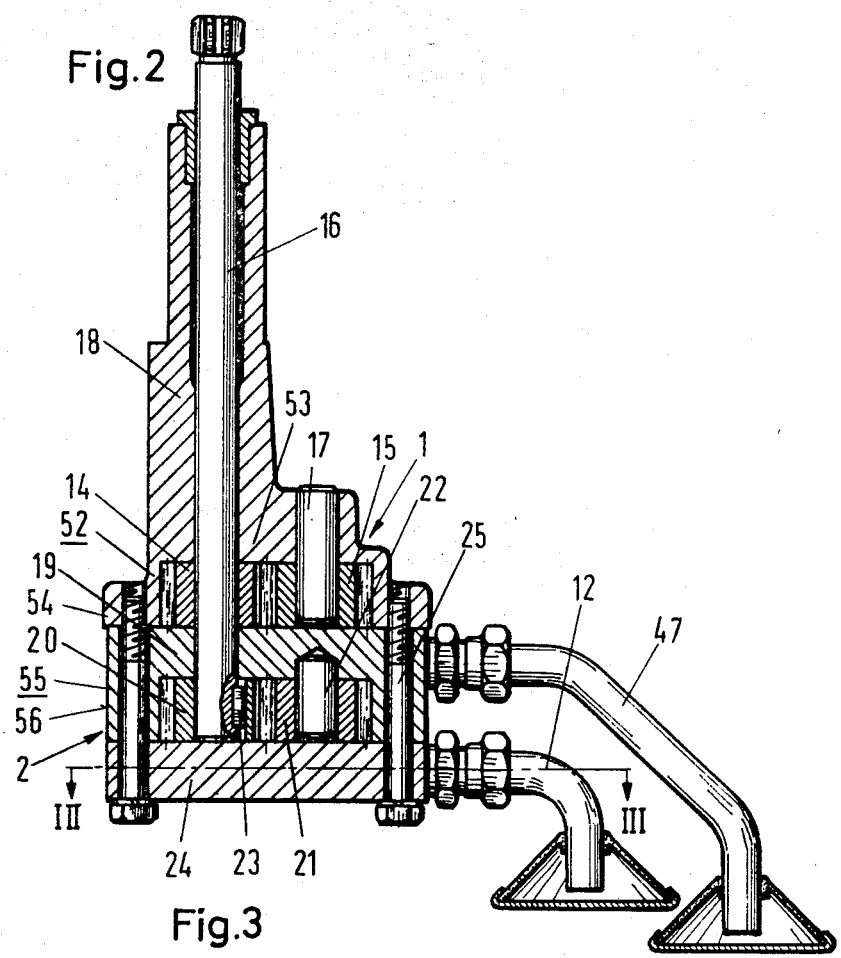
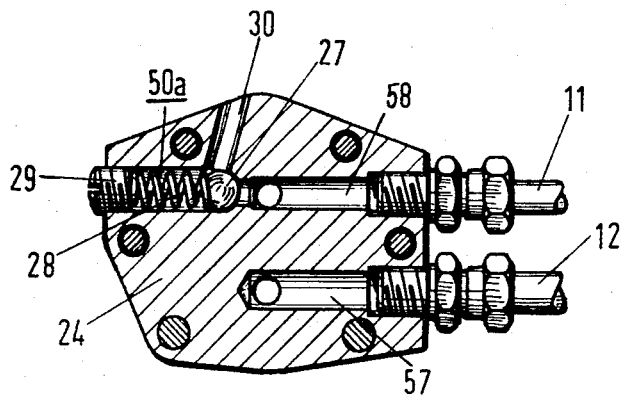

3,472,023
DRIVE ARRANGEMENT FOR AN AUTOMOTIVE VEHICLE
Joachim Gimmler, Schweinfurt am Main, Germany, assignor to Fichtel & Sachs A. G., Schweinfurt am Main, Germany
Filed Nov. 13, 1967, Ser. No. 683,762
Claims priority, application Germany, Nov. 11, 1966, F 31,084
Int. Cl. F16d *33/00;* F16h *41/04*
U.S. Cl. 60—12   8 Claims

ABSTRACT OF THE DISCLOSURE

A drive arrangement for an automotive vehicle in which a hydraulic torque converter connects an internal combustion engine to a multiple-speed transmission, and the oil for the hydraulic circuit is pumped from the engine sump, the lubricating oil pump for the engine and the supply pump for the hydraulic circuit gear pumps being arranged in a common housing and driven by a common drive shaft.

BACKGROUND OF THE INVENTION

This invention relates to drive arrangement, and particularly to a drive arrangement suitable for an automotive vehicle in which a hydraulic torque converter connects an internal combustion engine to a multiple-speed transmission.

In its more specific aspects, the invention is concerned with oil flow from the egine sump to lubricating passages in the engine, and from the same sump to the hydraulic torque converter.

The lubricating oil pump and the supply pump which maintains the oil level in the torque converter heretofore were separate units, separately driven. The known arrangement is relatively complex and therefore costly to build, requires more space than is desirable, and is inconvenient to maintain.

The object of the invention is the provision of a drive arrangement whose oil system avoids the afore-mentioned shortcomings.

SUMMARY OF THE INVENTION

In one of its aspects, the invention resides in a common housing for the lubricating oil pump and for the oil supply pump of the hydraulic torque converter, and in a common drive shaft which is fixedly connected to driven members of both pumps.

The invention, moreover, resides in specific features of the common housing and of the pump elements associated therewith which will presently become apparent as the disclosure proceeds with reference to the appended drawing which illustrates preferred embodiments of the invention.

BRIEF DESCRIPTION OF THE DRAWING

In the drawing:
FIG. 2 shows the lubricating oil and supply pumps of the arrangement of FIG. 1 in section on the axis of their common drive shaft;
FIG. 3 illustrates the device of FIG. 2 in section on the line III—III;
FIG. 4 shows modified pumps of the invention in section on the line IV—IV in FIG. 5;
and
FIG. 5 shows the modified pumps in a section parallel to the drive shaft.

DESCRIPTION OF THE PREFERRED EMBODIMENTS

Figure 1:
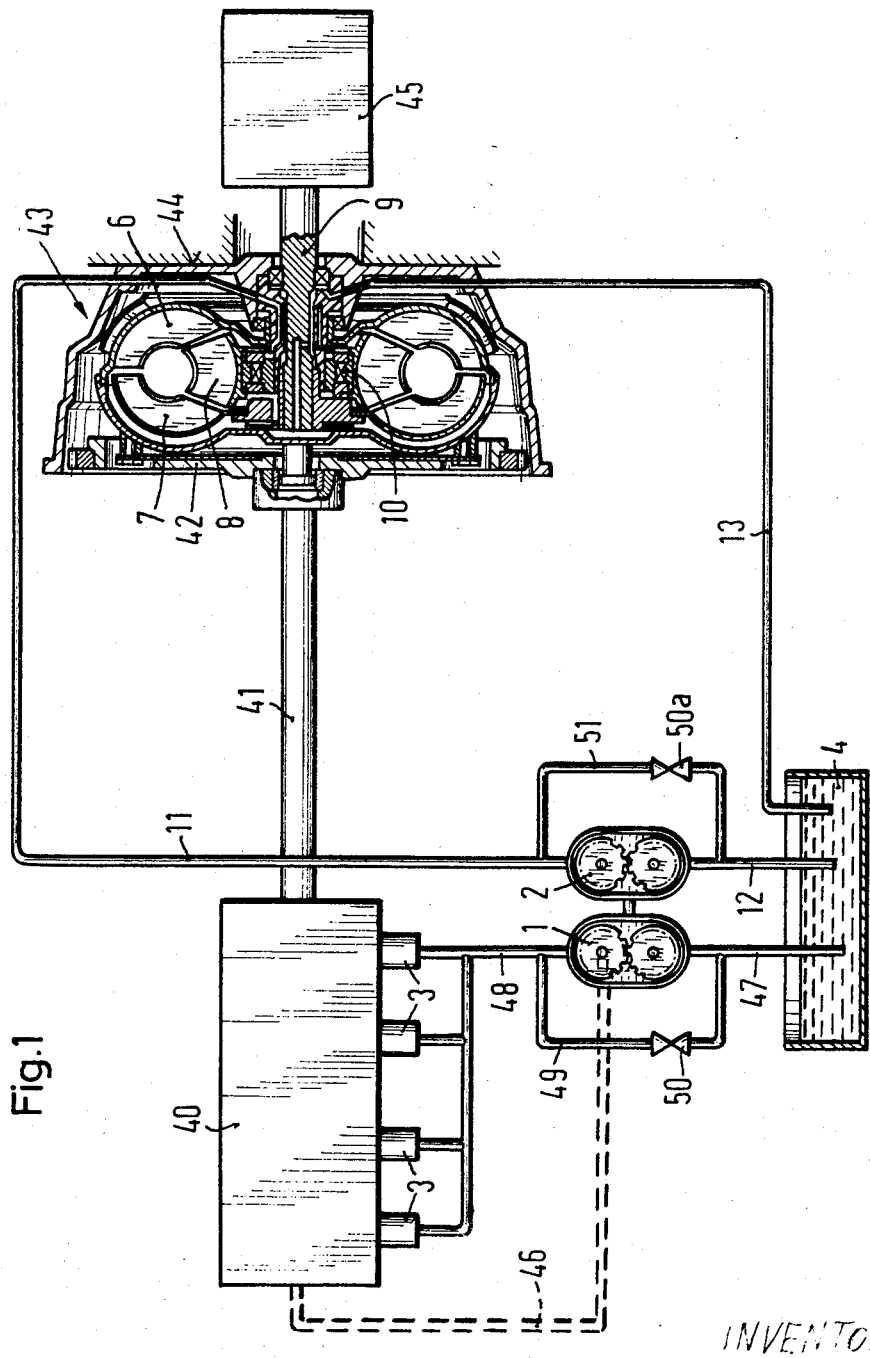
FIG. 1 shows the principal elements of a drive arrangement of the invention in their cooperation, individual elements being shown in section and partly diagrammatically.

Referring now to the drawing in detail, and initially to FIG. 1, there is seen an internal combustion engine 40, conventional in itself and not illustrated in detail whose crankshaft 41 drivingly connects the engine to a flywheel 42 and to the impeller 6 of a hydraulic torque converter 43, also equipped with a stator 8, and a turbine 7, the stator being connected to a fixed part 44 of the vehicle frame by an overrunning clutch 10, and the turbine 7 driving the input shaft 9 of a multiple-speed transmission 45, as is conventional.

The camshaft 46 of the engine, diagrammatically represented in broken lines, connects the crankshaft 41 of the engine 40 with two gear pumps, a lubricating oil pump 1 and a supply pump 2 which maintains the necessary oil level in the torque converter 43. The pump 1 draws oil from the engine sump 4 through an intake pipe 47, and drives the oil under pressure through an outlet pipe 48 into the nipples 3 on the lubricating passages of the engine 40, not themselves shown. The pipes 47, 48 are connected by a by-pass conduit 49 equipped with a pressure relief valve 50 which is opened automatically when the pressure differential between the pipes 47, 48 exceeds a predetermined value.

The supply pump 2 draws oil from the sump 4 through an intake pipe 12, and supplies the oil to the torque converter 43 through an outlet pipe 11. Excess oil may flow from the torque converter to the sump 4 through a return line 13. A pressure relief valve 50a in a by-pass 51 between the pipes 11, 12 maintains a desired pressure in the torque converter.

As is shown more clearly in FIGS. 2 and 3, the pumps 1, 2 are arranged in a common housing. A cup-shaped portion 52 of the housing has a heavy bottom wall 53 and a flange 54 around its open top, the terms "top" and "bottom" as employed herein relating to the normal position of a cup, and not implying a specific arrangement of the housing parts in space.

An elongated, tubular bearing portion 18 of the bottom wall 53 rotatably receives a drive shaft 16 on which the driven gear 14 of the lubricating oil pump 1 is fixedly mounted in the cavity of the housing portion 52. The idler gear 15 of the pump is rotatably supported on a pin 17 fastened in the bottom wall 53.

A cup-shaped housing portion 55 which receives the operating elements of the pump 2 has a bottom wall 19 superimposed on the flange 54 of the housing portion 52, and closing the cavity of the latter. The intake or suction pipe 47 and the outlet or pressure pipe 48 of the lubricating oil pump 1 are directly attached to the housing portion 52 in a manner shown in more detail in FIG. 3 with reference to the analogous pipes 11, 12 of the oil supply pump 2.

The shaft 16 passes through an opening in the bottom wall 19 of the cup-shaped housing portion 55, and the driven gear 20 of the oil supply pump 2 is fastened on the shaft by a key 23. The idler gear 21 of the supply pump 2 is rotatably supported on a pin 22 fastened in the bottom wall 19.

The open top defined by the annular axial wall 56 of the housing portion 55 is closed by a flat cover 24. Six sets of aligned bores in the housing portions 52, 55 and the cover 24 receive respective bolts 25 which hold the pump housing in the illustrated assembled condition.

Gaskets between the housing portions and seals about the shaft 16 are provided in a conventional manner, but have not been illustrated for the sake of simplicity.

As is seen in FIG. 3, a pair of bores 57, 58 in the cover 24 are connected to the intake and outlet pipes 12, 11 of the pump 2, and thus themselves constitute portions of the intake and outlet conduits of the pump. They communicate axially with low-pressure and high-pressure portions of the housing cavity occupied by the pump 2. The bore 58 is sealed from a return port 30 in the illustrated condition of the device by the ball 27 of the pressure relief valve 50a under the pressure of a helical compression spring 28 which may be adjusted by means of a set screw 29 accessible from the outside. The port 30 is connected to the inlet pipe 12 as is shown in FIG. 1, but has been omitted from FIG. 3 in order not to crowd the drawing.

FIG. 3 is also illustrative of corresponding interior structure of the bottom wall 19 on the housing portion 55. The inlet or suction pipes 12, 47 extend downward into the sump 4, and the open orifice of the pipe 12 is higher than that of the pipe 47. If the oil level in the sump drops, lubricating oil is still supplied to the vital parts of the engine even if there is not enough oil available to keep the torque converter fully supplied.

Except for certain features described hereinafter, the pump arrangement illustrated in FIGS. 4 and 5 is practically identical with that described above with reference to FIGS. 2 and 3, corresponding elements being designated by reference numerals having the same last two digits.

The lubricating-oil pump 101 is mounted on top of the oil supply pump 102, and the bottom wall 119 of the housing portion 155 which encloses the operating elements of the pump 102 closes the open top of the housing portion which encloses the operating elements of the pump 101.

The intake conduits 112, 147 of the two pumps are straight and coaxial. They jointly enter the common pump housing axially through the cover 124 in the low-pressure part of the pump 102, and the conduit 147 extends further through the bottom wall 119 into the low-pressure part of the pump 101. The outer orifice of conduit 112 is higher than that of the conduit 147.

The outlet conduits of the pumps of which only the pipe 111 is seen in FIGS. 4 and 5 extend approximately radially from the pump housing and the pressure relief valve 151 associated with the pump 102 has a set screw 129 mounted in the cover 124, whereas the spring 128 and ball 127 of the valve are received in an axial bore in the housing portion 155 which also provides the port 130.

The pump arrangement illustrated and described is simple to build and to maintain. It is extremely compact and thus provides space needed for other elements of the driving arrangement.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a drive arrangement for an automotive vehicle and the like including an internal combustion engine having an oil sump, a lubricating oil pump which draws oil from said sump and feeds the oil under pressure to elements of said engine, a hydraulic torque converter drivingly connected to said engine, an oil supply pump which draws oil from said sump and supplies the oil to said torque converter under pressure, each pump having operating elements driven by said engine, a suction intake conduit, and a pressure outlet conduit, the improvement in the pumps which comprises:

(a) a housing common to said lubricating oil pump and to said oil supply pump,
  (1) said housing including two substantially cup-shaped portions having each a bottom wall and an open top opposite said bottom wall, and a cover portion,
  (2) the bottom wall of one of said cup-shaped portions substantially closing the open top of the other cup-shaped portion, and said cover portion substantially closing the open top of said one cup-shaped portion,
  (3) the operating elements of one of said pumps being received in said one cup-shaped portion, and the operating elements of the other pump being received in said other cup-shaped portion, the operating elements of each pump including a driven member,
  (4) said bottom wall of said one cup-shaped portion being formed with two bores respectively constituting portions of the intake and outlet conduits of said other pump and communicating with the interior of said other cup-shaped portion,
  (5) said conduits of each pump extending outward of said housing; and
(b) a common drive shaft fixedly connected to each of said driven members.

2. In an arrangement as set forth in claim 1, said portions of the housing being each formed with a plurality of bores; said bores constituting sets of aligned bores extending in said two cup-shaped portions and said cover portion respectively, each set receiving a unitary fastening member, said fastening member extending in each bore of said set.

3. In an arrangement as set forth in claim 1, said operating elements of each pump including two meshingly cooperating gears, one gear of each pump being fixedly mounted on said drive shaft.

4. In an arrangement as set forth in claim 1, said cover member being formed with two bores respectively constituting portions of the intake and outlet conduits of said one pump and communicating with the interior of said one cup-shaped portion.

5. In an arrangement as set forth in claim 4, two pipes sealingly connected to the bores of the bottom wall of said one cup-shaped housing portion and of said cover portion respectively which constitute portions of the respective intake conduits of said pumps, said pipes constituting the remainder of the respective intake conduits and having open orifices remote from the associated bores in said sump, the orifice on the intake conduit of said supply pump being located above the orifice on the intake conduit of said lubricating oil pump.

6. In an arrangement as set forth in claim 4, the bores of said bottom wall of the one cup-shaped portion and of said cover portion respectively constituting pairs of bores, and a pressure relief valve communicating with the bores of one of said pairs in said housing for connecting the same when the pressure in one bore exceeds the pressure in the other bore by a predetermined value.

7. In a drive arrangement for an automotive vehicle and the like including an internal combustion engine having an oil sump, a lubricating oil pump which draws oil from said sump and feeds the oil under pressure to elements of said engine, a hydraulic torque converter drivingly connected to said engine, an oil supply pump which draws oil from said sump and supplies the oil to said torque converter under pressure, each pump having operating elements driven by said engine, a suction intake conduit, and a pressure outlet conduit, the improvement in the pumps which comprises:

(a) a housing common to said lubricating oil pump and to said oil supply pump,
  (1) said housing including two substantially cup-shaped portions having each a bottom wall and an open top opposite said bottom wall, and a cover portion,
  (2) each of said cup-shaped portions receiving the operating elements of a respective one of said pumps, the operating elements of each pump including a driven member,
  (3) the bottom wall of one of said cup-shaped portions substantially closing the open top of the other cup-shaped portion, and said cover portion substantially closing the open top of said one cup-shaped portion, (4) said conduits of each pump extending outward of said housing, the intake conduit of one of said pumps being coaxially received in the intake conduit of the other pump, and the coaxial intake conduits jointly entering said housing through said cover portion; and (b) a common drive shaft fixedly connected to each of said driven members.

8. In an arrangement as set forth in claim 7, said coaxial intake conduits having respective orifices in said sump, the orifice of the intake conduit of said lubricating oil pump being higher than the orifice of the intake conduit of said supply pump.

References Cited

UNITED STATES PATENTS

| | | | |
|---|---|---|---|
| 1,218,300 | 3/1917 | Nelson | 230—158 XR |
| 2,151,075 | 3/1939 | Berger | 60—12 XR |
| 2,186,748 | 1/1940 | Berger | 60—12 XR |

EDGAR W. GEOGHEGAN, Primary Examiner

U.S. Cl. X.R.

60—54; 103—126